(12) United States Patent
Akitomo et al.

(10) Patent No.: US 8,917,374 B2
(45) Date of Patent: Dec. 23, 2014

(54) LIQUID CRYSTAL DISPLAY DEVICE INCLUDING ARRANGEMENT OF COLORED LAYER AND COLUMNAR SPACER

(75) Inventors: Masaharu Akitomo, Osaka (JP); Ryohki Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 151 days.

(21) Appl. No.: 13/637,089

(22) PCT Filed: Jan. 25, 2011

(86) PCT No.: PCT/JP2011/051313
§ 371 (c)(1),
(2), (4) Date: Sep. 25, 2012

(87) PCT Pub. No.: WO2011/132439
PCT Pub. Date: Oct. 27, 2011

(65) Prior Publication Data
US 2013/0021566 A1    Jan. 24, 2013

(30) Foreign Application Priority Data

Apr. 19, 2010 (JP) ................................. 2010-096035

(51) Int. Cl.
| | | |
|---|---|---|
| *G02F 1/1339* | (2006.01) | |
| *G02F 1/1335* | (2006.01) | |
| *G02B 5/20* | (2006.01) | |

(52) U.S. Cl.
CPC ...... *G02F 1/13394* (2013.01); *G02F 1/133514* (2013.01); *G02B 5/201* (2013.01); *G02F 2001/13396* (2013.01); *G02F 2001/13398* (2013.01); *G02F 2201/40* (2013.01); *G02F 2201/52* (2013.01)
USPC ............................ 349/155; 349/106; 349/157

(58) Field of Classification Search
CPC .......... G02F 1/13394; G02F 1/133514; G02F 2001/13396
USPC ......................................... 349/106, 155–157
See application file for complete search history.

(56) References Cited

U.S. PATENT DOCUMENTS 5,530,570 A * 6/1996 Terumoto ...................... 349/106
6,067,144 A * 5/2000 Murouchi ..................... 349/156

(Continued)

FOREIGN PATENT DOCUMENTS

JP    2002-341354 A    11/2002
JP    2004-078226 A    3/2004

(Continued)

OTHER PUBLICATIONS

Official Communication issued in International Patent Application No. PCT/JP2011/051313, mailed on Mar. 22, 2011.

*Primary Examiner* — Michael Caley
(74) *Attorney, Agent, or Firm* — Keating & Bennett, LLP

(57) ABSTRACT

The present invention is to provide a liquid crystal display device in which, even when a columnar spacer is misaligned, the columnar spacer can be light-shielded without reduction of an aperture ratio. According to the present invention, there is provided a liquid crystal display device which includes a pair of substrates spaced at a distance from each other by a plurality of columnar spacers, and a liquid crystal layer sandwiched between the pair of substrates, and in which a pixel is formed by picture elements of a plurality of colors, the liquid crystal display device being featured in that one of the pair of substrates includes colored layers of a plurality of colors, and a light shielding layer, in that at least one of the colored layers of the plurality of colors has a region in which a colored layer of the same color is integrally arranged on respective picture elements adjacent to each other, and has a straight portion and an extension portion extending from the straight portion, in that at least one of the plurality of columnar spacers is provided at a position overlapping with the extension portion, and has a substantially rhombus-shaped surface or a substantially circular surface, which is in contact with the substrate, and the contour line of the extension portion has a shape corresponding to the contour line of the columnar spacer provided at the position overlapping with the extension portion.

20 Claims, 7 Drawing Sheets

(56) References Cited

U.S. PATENT DOCUMENTS

| | | | |
|---|---|---|---|
| 7,002,659 B1* | 2/2006 | Yamazaki et al. | 349/155 |
| 2002/0080320 A1* | 6/2002 | Suzuki et al. | 349/153 |
| 2005/0007539 A1 | 1/2005 | Taguchi et al. | |
| 2005/0052607 A1 | 3/2005 | Mori et al. | |
| 2005/0099577 A1 | 5/2005 | Lee et al. | |
| 2007/0182888 A1 | 8/2007 | Inoue et al. | |
| 2007/0242210 A1 | 10/2007 | Lee et al. | |
| 2007/0258034 A1 | 11/2007 | Lee et al. | |
| 2008/0180609 A1 | 7/2008 | Hong et al. | |
| 2009/0161046 A1 | 6/2009 | Tokuda et al. | |
| 2011/0128480 A1* | 6/2011 | Liu et al. | 349/106 |

FOREIGN PATENT DOCUMENTS

| | | |
|---|---|---|
| JP | 2004-341213 A | 12/2004 |
| JP | 2005-107494 A | 4/2005 |
| JP | 2006-091504 A | 4/2006 |
| JP | 2008-181132 A | 8/2008 |
| JP | 2009-069331 A | 4/2009 |
| KR | 10-2008-0049193 A | 6/2008 |

* cited by examiner

LIQUID CRYSTAL DISPLAY DEVICE INCLUDING ARRANGEMENT OF COLORED LAYER AND COLUMNAR SPACER

TECHNICAL FIELD

The present invention relates to a liquid crystal display device. More particularly, the present invention relates to a liquid crystal display device having a columnar spacer.

BACKGROUND ART

A liquid crystal display device is a display device including a pair of substrates (for example, an active matrix substrate and a color filter substrate) facing each other via a liquid crystal layer. With the spread of use of liquid crystal display devices, the performance of the liquid crystal display devices has been improved.

In order to improve the display quality of the liquid crystal display device, it is necessary to precisely control the thickness of the liquid crystal layer (hereinafter also referred to as a cell gap). Especially, in a large-sized liquid crystal display device which has become widely utilized in recent years, it is necessary to control the cell gap uniformly over a very large area.

The cell gap is usually controlled by spacers arranged between the pair of substrates. As the conventional spacer, a particle-shaped spacer (for example, a plastic bead) has been used, and these spacers are used by being dispersed on the substrate. However, the positions at which the spacers are arranged cannot be controlled by the system of dispersing the spacers, such as plastic beads. This has become a cause of disturbing the alignment of liquid crystal molecules in a liquid crystal layer used as a display region. When there is a region in which the alignment of liquid crystal molecules is disturbed, the region is visually recognized as having display roughness. Further, when such spacers are used, the cell gap is varied due to the influence of recessions and projections on the substrate surface. In some cases, this has resulted in display unevenness.

To cope with this, in recent years, there has been adopted a method in which column-shaped spacers are formed between the substrates by a photolithography process using a photosensitive material. The spacer formed by this method is also referred to as a columnar spacer (photo spacer). However, there are various problems also in the case of forming the columnar spacers, and hence, for example, the following studies have been made.

When the columnar spacer is locally pressed from the outside, the amount of deformation of the cell gap differs according to the magnitude of the pressing force. The cell gap is also deformed by the atmospheric pressure and the weight of the substrate itself, and tends to be reduced at a position closer to the center of the substrate and to be increased at a position closer to the outer side of the substrate. To cope with this, a method has been tried in which the deformation ratio of the cell gap with respect to the compressive stress is made different for each of the columnar spacers so that the cell gap is uniformly maintained (see, for example, Patent Literature 1).

Further, since the alignment of liquid crystal molecules is disturbed around the columnar spacer, a black matrix is provided on the region where the columnar spacer is formed, and thereby the region is set as a non-display region. When a columnar spacer is formed by using the photolithography process, an alignment mark is provided at a desired position on a substrate, and on the basis of the alignment mark, the columnar spacer is provided so as to overlap with the black matrix. However, there is a case where the alignment mark is shifted, so that the columnar spacer, which is to be formed to overlap with the black matrix, is formed at a position overlapping with a color filter. For this reason, an attempt has been made in which the width dimension of the columnar spacer is adjusted to a desired condition corresponding to the width dimensions of the black matrix and the color filter so that, even when the alignment mark is shifted, the deterioration of display quality is prevented (see, for example, Patent Literature 2).

Further, an attempt has been made in which the stability of retaining the cell gap is improved in such a manner that, when a columnar spacer is formed in a region making no contribution to the display, the surface of the columnar spacer, which faces a light shielding layer, is made flat, and also the surface of the light shielding layer, which faces the columnar spacer, is also made flat, and that the area of the surface of the light shielding layer is formed larger than the area of the surface of the columnar spacer (see, for example, Patent Literature 3).

CITATION LIST

Patent Literature

Patent Literature 1: JP 2004-78226 A
Patent Literature 2: JP 2004-341213 A
Patent Literature 3: JP 2006-91504 A

SUMMARY OF INVENTION

Technical Problem

The inventors of the present invention have conducted various studies about columnar spacers, and paid attention to a form in which the area of the surface of a light shielding layer (black matrix), the surface facing the columnar spacer, is formed larger than the area of the surface of the columnar spacer, the surface facing the light shielding layer. The region, in which the light shielding layer is formed, does not transmit light. Therefore, when this region is made too large, the aperture ratio is reduced.

FIG. 12 is a planar schematic view showing a conventional form of arranging light shielding layers and columnar spacers. Note that, in FIG. 12, a pair of substrates, which form a liquid crystal display panel, are both collectively illustrated. As shown in FIG. 12, a general active matrix substrate, which forms a conventional liquid crystal display device, includes scanning lines 121, data lines 122, TFTs (thin film transistors) 123, and pixel electrodes 124. The scanning line 121 is connected to a driver which outputs a scanning signal, and the data line 122 is connected to a driver which outputs a data signal. The data line 122 is connected to the pixel electrode 124 via the TFT 123, and at the timing at which the scanning signal is inputted into the scanning line 121, the data line 122 is made conductive with the pixel electrode 124 so that the data signal is inputted into the pixel electrode 124.

In a substrate (color filter substrate) facing the active matrix substrate via a liquid crystal layer, a colored layer 111 and a light shielding layer 112 are formed. Examples of the colored layer 111 include a combination of three colored layers of a red colored layer 111R, a green colored layer 111G, and a blue colored layer 111B. The colored layer 111 is formed at a position overlapping with the pixel electrode 124. The light shielding layer 112 is formed at portions overlapping with the scanning line 121, the data line 122, and the TFT 123 of the active matrix substrate. In this configuration, the light used as display light is transmitted through the pixel electrode 124 and the colored layer 111, so as to be recognized by an observer.

Between the active matrix substrate and the color filter substrate, a cell gap is retained via columnar spacers 113. As shown in FIG. 12, the columnar spacer 113 is provided at a position overlapping with the light shielding layer 112. The light shielding layer 112 is provided to be larger than the columnar spacer 113 so as to cover the whole of the columnar spacer 113. However, as shown in FIG. 12, when the shape of the surface of the columnar spacer 113, the surface being in contact with the light shielding layer 112, is greatly different from the shape of the surface of the light shielding layer 112, the surface being in contact with the columnar spacer 113, a portion, in which the distance between the contour line of the columnar spacer 113 and the contour line of the light shielding layer 112 is small, is generated. For example, in FIG. 12, each of the columnar spacer 113 and of the light shielding layer 112 overlapping with the columnar spacer 113 is formed to have a substantially square shape, but these square shapes are rotated by 45° with respect to each other. Further, in such a case, when the columnar spacer 113 is misaligned, a portion in which the columnar spacer 113 does not overlap with the light shielding layer 112 is generated. On the other hand, in order to prevent this, it is conceivable to increase the area of the light shielding layer 112. However, when the area of the light shielding layer 112 is increased, the aperture ratio is reduced.

The present invention has been made in view of the above-described circumstances, and an object of the present invention is to provide a liquid crystal display device which, even when the columnar spacer is misaligned, can shield the columnar spacer without reducing the aperture ratio.

Solution to Problem

The inventors of the present invention conducted various studies about the problem at the time when the columnar spacers are misaligned, and paid attention to the shape of the outer periphery of the columnar spacer. Then, the inventors of the present invention paid attention to the fact that, when the light shielding layer having a larger area is provided to sufficiently cover the columnar spacer, the aperture ratio is greatly reduced, and found out that, when the shapes of the light shielding layer and of the colored layer are modified along the outer periphery of the columnar spacer, the columnar spacer can be efficiently light-shielded without excessively increasing the area of the light shielding layer. More specifically, the inventors of the present invention found out that, in the case where the shape of the picture element is modified along the contour line of the columnar spacer, the distance between the contour line of the columnar spacer, and the contour lines of the light shielding layer and of the colored layer is hardly varied, and that, even when the columnar spacer is misaligned, the light shielding property of the columnar spacer is sufficiently secured. As a result, the inventors of the present invention came up with an idea that, with such a configuration, the above-described problems can be effectively solved, and reached the present invention.

That is, the present invention is to provide a liquid crystal display device which includes a pair of substrates spaced at a distance from each other by a plurality of columnar spacers, and a liquid crystal layer sandwiched between the pair of substrates, and in which a pixel is formed by picture elements of a plurality of colors, the liquid crystal display device being featured in that one of the pair of substrates includes colored layers of a plurality of colors, and a light shielding layer, in that at least one of the colored layers of the plurality of colors has a region in which a colored layer of the same color is integrally arranged on respective picture elements adjacent to each other, and has a straight portion and an extension portion extended from the straight portion, in that at least one of the plurality of columnar spacers is provided at a position overlapping with the extension portion, and has a substantially rhombus-shaped surface or a substantially circular surface, which is in contact with the substrate, and in that (1) the contour line of the extension portion has a shape corresponding to the contour line of the columnar spacer provided at the position overlapping with the extension portion, and/or (2) the contour line of the light shielding layer has a straight portion and a corner portion, the corner portion having a shape corresponding to the contour line of the columnar spacer provided at the position overlapping with the extension portion.

The configuration of the liquid crystal display device of the present invention is not especially limited by other components as long as it essentially includes such components.

The liquid crystal display device according to the present invention includes a pair of substrates spaced at a distance from each other by a plurality of columnar spacers, and a liquid crystal layer sandwiched between the pair of substrates, and is configured such that a pixel is formed by picture elements of a plurality of colors. For example, one of the pair of substrates can be used as an active matrix substrate, and the other of the pair of substrates can be used as a color filter substrate. The picture elements of the plurality of colors can be realized by the colored layers arranged in correspondence with the respective picture elements, and various display colors can be expressed by adjusting the balance between the respective colors. The cell gap (the thickness of the liquid crystal layer) is fixedly retained by the columnar spacers, and a plurality of spacers are provided for one panel.

One of the pair of substrates includes colored layers of a plurality of colors and a light shielding layer. At least one of the colored layers of the plurality of colors has a region in which a colored layer of the same color is integrally arranged on the respective picture elements adjacent to each other. The color of each of the picture elements is determined by the color of each of the colored layers. Therefore, in principle, a colored layer of a different color is arranged for each picture element, and one pixel is formed by a combination of the colors of a plurality of the picture elements. The kinds, the number, and the arrangement order of the colors of the picture elements, which form pixels, are not limited in particular. Examples of the combination of the colors of the picture elements include combinations, such as a combination of R (red), G (green) and B (blue), a combination of R (red), G (green), B (blue), and Y (yellow), a combination of R (red), G (green), B (blue), and W (white), and a combination of four or more of multiple primary colors, such as R (red), G (green), B (blue), C (cyan), M (magenta), and Y (yellow). However, in the liquid crystal display device according to the present invention, there is a region in which a colored layer of the same color is formed on picture elements adjacent to each other. In the case where a colored layer having the same color is formed on mutually adjacent picture elements of each of the colors, the colored layers are formed in a so-called stripe array. When the colored layers are formed in the stripe array, each of colored layers having different colors is formed in the stripe shape (streak shape), and hence the manufacturing process is simplified. The light shielding layer plays a role of preventing light leakage and mixed color. The light shielding layer and the colored layer may partially overlap with each other. The region partitioned by the light shielding layer is a picture element aperture region.

At least one of the colored layers of the plurality of colors includes a straight portion, and an extension portion extending from the straight portion, and at least one of the plurality of columnar spacers is provided at a position overlapping with the extension portion. The extension portion is a portion for arranging the columnar spacer, and one of the features of the present invention is that the colored layer integrally arranged on the picture elements adjacent to each other is not formed only by a straight portion as in the conventional case, but has an extension portion as well as the straight portion.

At least one of the plurality of columnar spacers has a substantially rhombus-shaped surface or a substantially circular surface, which is in contact with the substrate. In this specification, the rhombus shape means a parallelogram which has sides forming an angle with respect to the contour line of the straight portion of the colored layer, and which has diagonal lines crossing each other at right angle. The lengths of the respective sides may be the same or may be different from each other. When the contour line of the columnar spacer is formed in a substantially rhombus shape, it is possible to obtain a shape which forms an angle with respect to the contour line of the straight portion of the colored layer, and hence an equal distance can be easily secured between the contour line of the columnar spacer and the contour line of the extension portion. Further, when the contour line of the columnar spacer is formed in a substantially circular shape, an equal distance can be easily secured between the contour line of the columnar spacer and the contour line of the extension portion.

Further, the liquid crystal display device according to the present invention has a feature (1) that the contour line of the extension portion has a shape corresponding to the contour line of the columnar spacer provided at a position overlapping with the extension portion, and/or a feature (2) that the contour line of the light shielding layer has a straight portion and a corner portion, the corner portion having a shape corresponding to the contour line of the columnar spacer provided at a position overlapping with the extension portion. It is more preferred that the liquid crystal display device according to the present invention has both the feature (1) and the feature (2), and thereby a structure that is very strong against the misalignment of the columnar spacer can be obtained. Note that the contour line of the columnar spacer means the contour line of the upper surface or the lower surface of the columnar spacer, the surface being in contact with the substrate.

In the case where, as described in the feature (1), the extension portion and the columnar spacer are formed so that the shape of the contour line of the extension portion corresponds to the contour line of the columnar spacer, even when the columnar spacer is misaligned, a sufficient distance is secured between the contour line of the columnar spacer and the contour line of the extension portion. As a result, the influence of the variation in the film thickness of the underlayer of the columnar spacer is mostly eliminated, and thereby it is possible to avoid the deterioration of the display quality due to the display unevenness which is caused at the time when the luminance is changed due to the variation in the cell thickness.

In the case where, as described in the feature (2), the extension portion and the columnar spacer are formed so that the shape of the corner portion of the contour line of the light shielding layer corresponds to the contour line of the columnar spacer, even when the columnar spacer is misaligned, a sufficient distance is secured between the contour line of the columnar spacer and the corner portion of the contour line of the light shielding layer. As a result, it is possible to sufficiently shield the light leakage due to the alignment disturbance of liquid crystal molecules around the columnar spacer, and hence it is possible to avoid the deterioration of the display quality due to the roughness of the display.

Preferable embodiments of the liquid crystal display device of the present invention are mentioned in more detail below.

It is preferred that the liquid crystal display device includes a columnar spacer whose height is smaller than the height of the columnar spacer provided at a position overlapping with the extension portion. In the following, the columnar spacer provided at the position overlapping with the extension portion is also referred to as a main spacer, and the columnar spacer whose height is smaller than the main spacer is also referred to as a sub-spacer. In the case where the columnar spacer having a smaller height is provided as a sub-spacer in this way, the liquid crystal display device is designed to be strong against pressing force. When the screen of the liquid crystal display device is pushed, the main spacer is made to bow inward. However, when the screen of the liquid crystal display device is further strongly pushed, the sub-spacer having a slightly smaller height plays a role of dispersing the pressing force. Further, in the case where all the columnar spacers are formed only as the main spacers, when the pressing force applied to the screen is too large, the columnar spacer tends to be plastically deformed so as not to return to the original state. However, in the case where the pressing force is dispersed by the sub-spacers, the pressing force applied to the main spacer is reduced, so that the main spacer is hardly plastically deformed. As a result, even when a larger pressing force is applied to the main spacer, the main spacer is elastically deformed so as to easily return to the original state. This configuration is preferably adopted in a type in which the glass thickness is thin. Note that the sub-spacer may be provided at a position overlapping with the extension portion of the colored layer, or may be provided at a position overlapping with the straight portion of the colored layer. Further, it is preferred that the surface of the spacer having the smaller height, the surface being in contact with the substrate, is formed in a substantially regular octagonal shape.

It is preferred that each of the colored layers of the plurality of colors has a straight portion and a folded portion, and that the extension portion forms a part of the folded portion. In other words, the present form is configured such that each of at least two mutually adjacent colored layers, which have different colors, and each of which is formed in a stripe array, includes the extension portion, and such that the respective extension portions are provided at the positions line-symmetrical to each other with respect to the symmetrical axis which is the extending direction (stripe direction) of the colored layer. Thereby, each of the colored layers, which have different colors and which are adjacent to each other, is formed in the same shape, and hence excellent effects can be obtained from the viewpoint of improving the uniformity of the display and the viewpoint of improving the efficiency of the manufacturing process.

Preferred forms of the columnar spacer, the extension portion, and the light shielding layer will be described in detail.

It is preferred that the contour line of the straight portion of the colored layer and the contour line of the extension portion of the colored layer form an angle of about 45°. Further, it is preferred that the contour line of the straight portion of the light shielding layer and the contour line of the corner portion of the light shielding layer form an angle of about 45°.

It is preferred that the contour line of the extension portion of the colored layer and the contour line of the columnar spacer form an angle substantially in parallel with each other, and specifically, form an angle of ±10° or less. Further, it is preferred that the contour line of the corner portion of the light shielding layer and the contour line of the columnar spacer are substantially in parallel with each other, and specifically, form an angle of ±10° or less.

Examples of the preferred form of the extension portion of the colored layer include, in the plan view of the substrate (when the substrate surface is seen in the normal direction of the substrate), a form (1) in which the distal end of the extension portion is sharpened, a form (2) in which the distal end of the extension portion is rounded, and a form (3) in which the distal end of the extension portion is substantially in parallel with the contour line of the straight portion. In the case where the distal end of the extension portion is sharped or rounded, an equal distance between the distal end of the extension portion and the contour line of the columnar spacer can be easily secured. Further, in the case where the distal end of the extension portion has a side having an inclined angle with respect to the contour line of the straight portion, an equal distance between the distal end of the extension portion and the contour line of the columnar spacer can be easily secured. Note that, when the contour line of the extension portion is formed to correspond to the contour line of the columnar spacer as a whole, a part of the distal end portion of the extension portion may be substantially in parallel with the contour line of the straight portion.

Examples of the other preferred forms of the extension portion of the colored layer include, in the plan view of the substrate (when the substrate surface is seen in the normal direction of the substrate), a form (1) in which the shape of the extension portion is a substantially trapezoidal shape, a form (2) in which the shape of the extension portion is a substantially semicircular shape, a form (3) in which the shape of the extension portion is a substantially isosceles triangular shape, and a form (4) in which the shape of the extension portion is a substantially right-angled isosceles triangular shape. The shape of the extension portion means a shape of the portion of the whole colored layer except the straight portion. When the extension portion has a substantially trapezoidal shape or a substantially isosceles triangular shape, the extension portion has a side having an inclined angle with respect to the contour line of the straight portion, and hence an equal distance between the extension portion and the contour line of the columnar spacer can be easily secured. Further, when the extension portion has a substantially right-angled isosceles triangular shape, the extension portion has an angle of about 45° with respect to the extending direction of the straight portion, a more equal distance between the extension portion and the contour line of the columnar spacer can be easily secured. Further, even when the extension portion has a substantially semicircular shape, an equal distance between the extension portion and the contour line of the columnar spacer can be easily secured.

The preferred forms of the columnar spacer, the colored layer, and the light shielding layer can be suitably combined with each other as long as the combined forms are not theoretically inconsistent with each other. As a particularly preferred form, the combinations in which the distance between the contour line of the columnar spacer and the contour line of the extension portion of the colored layer, or the distance between the contour line of the columnar spacer and the contour line of the light shielding layer can be easily maintained to be uniform (for example, a form in which the one has a curved line and the other also has a curved line, and a form in which one has a straight line and the other also has a straight line) are preferred.

Advantageous Effects of Invention

According to the present invention, an effect (1) is obtained in which, since a sufficient distance is secured between the contour line of the columnar spacer and the contour line of the extension portion, even when the columnar spacer is misaligned, the influence of the variation in the film thickness of the underlayer of the columnar spacer is reduced, and hence it is possible to avoid the deterioration of the display quality due to the display unevenness which is generated at the time when the luminance is changed due to a variation of the cell thickness, and/or an effect (2) is obtained in which, since a sufficient distance is secured between the contour line of the columnar spacer and the corner portion of the contour line of the light shielding layer, even when the columnar spacer is misaligned, the light leakage due to the alignment disturbance of the liquid crystal molecules around the columnar spacer can be sufficiently shielded, and hence it is possible to avoid the deterioration of the display quality due to the roughness of the display.

DESCRIPTION OF EMBODIMENTS

Figure 1:
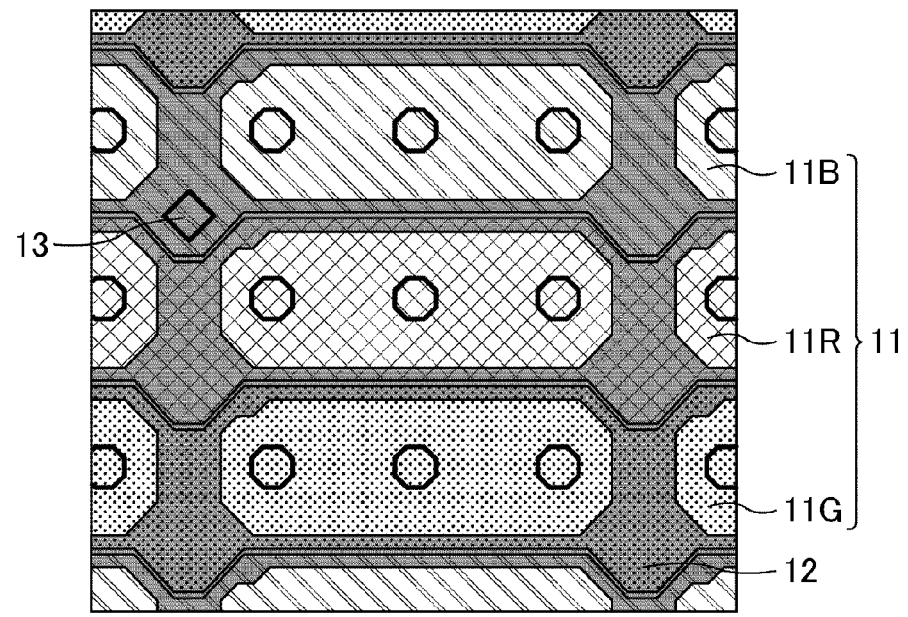
FIG. 1 is a planar schematic view in which the substrate surface of a liquid crystal display device of Embodiment 1 is enlarged.

The present invention will be mentioned in more detail referring to the drawings in the following embodiments, but is not limited to these embodiments.

Embodiment 1

A liquid crystal display device of Embodiment 1 includes a pair of substrates spaced at a distance from each other by a plurality of columnar spacers, and a liquid crystal layer sandwiched between the pair of substrates, and is configured such that a pixel is formed by picture elements of a plurality of colors. One of the pair of substrates is, for example, an active matrix substrate, and the other of the pair of substrates is a color filter substrate.

FIG. 1 is a planar schematic view in which the substrate surface of the liquid crystal display device of Embodiment 1 is enlarged. As shown in FIG. 1, the display screen of the liquid crystal display device of Embodiment 1 is configured by a plurality of pixels, and one pixel is configured by picture elements of a plurality of colors.

One of the pair of substrates includes colored layers 11 and a light shielding layer 12. A color of a picture element is determined by the color of each of the colored layers 11. The kind, the number and the arrangement order of the colors of the picture elements are not limited in particular. Examples of the combination of the colors of the picture elements include combinations, such as a combination of R (red), G (green) and B (blue), a combination of R (red), G (green), B (blue), and Y (yellow), and a combination of R (red), G (green), B (blue), and W (white). FIG. 1 shows an example of the combination of a red colored layer 11R, a green colored layer 11G, and a blue colored layer 11B. Each of the colored layers 11 is partitioned by the light shielding layer 12. The region, in which the light shielding layer 12 is not formed, is a picture element aperture region which transmits light. The light shielding layer 12 is arranged between the respective colored layers 11, and there is also a region where the light shielding layer 12 overlaps with the colored layer 11.

Figure 2:
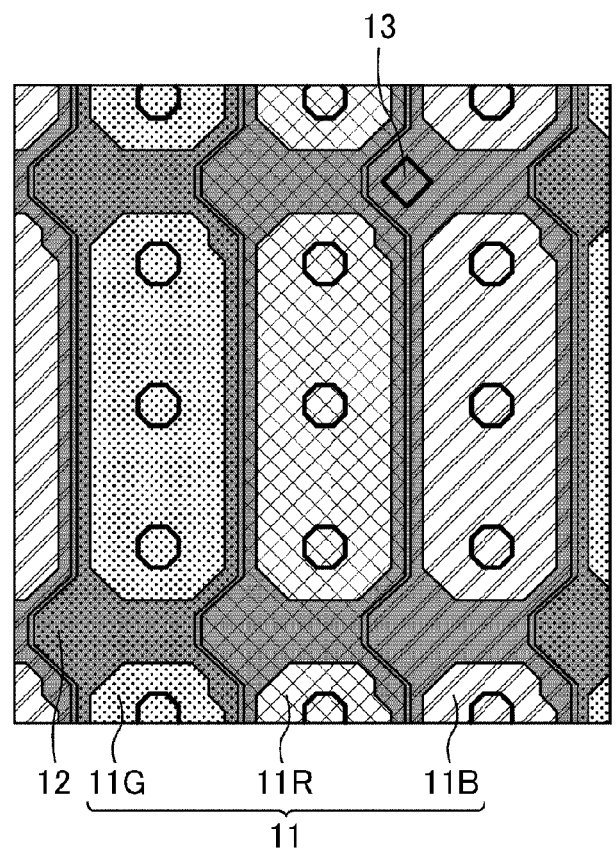
FIG. 2 is a planar schematic view showing a modification of Embodiment 1.

Each of the colored layers 11 of the plurality of colors is formed in a so-called stripe array in which the colored layer 11 of the same color is arranged integrally on the picture elements adjacent to each other. However, each of the colored layers 11 in Embodiment 1 has not only a straight portion but also an extension portion extending from the straight portion. The extension portion corresponds to a recess of the straight portion of the adjacent colored layer 11, when seen from the adjacent colored layer 11. For example, in FIG. 1, the blue colored layer 11B and the red colored layer 11R are provided so as to be adjacent to each other, and the extension portion of the blue colored layer 11B is extended toward the side of the red colored layer 11R. Therefore, the extension portion of the blue colored layer 11B corresponds to a recess of the red colored layer 11R. Further, the extension portion and the recess are formed in each of the colored layers 11, and hence the colored layer 11 of each color has a portion which is folded (folded portion). That is, the colored layer 11 of each color has a straight portion and a folded portion, and the extension portion forms a part of the folded portion. Note that FIG. 1 shows the colored layers 11 each having a lateral stripe array, but as shown in FIG. 2, each of the colored layers 11 may have a longitudinal stripe array. Further, the picture element may have not only a laterally long shape as shown in FIG. 1 but also a longitudinally long shape as shown in FIG. 2. FIG. 2 is a planar schematic view of a modification of Embodiment 1.

In Embodiment 1, a columnar spacer 13 is provided at a position overlapping with the extension portion of each of the colored layers 11. More specifically, the shape of the extension portion of each of the colored layers 11 in Embodiment 1 is a trapezoidal shape in the plan view of the substrate, and the distal end of the extension portion is in parallel with the contour line of the straight portion. Further, the contour line of the straight portion and the contour line of the extension portion form an angle of about 45°. Further, in the columnar spacer 13 provided at a position overlapping with the extension portion, the surface of the columnar spacer 13, the surface being in contact with the substrate, has a substantially rhombus shape, so as to have a side forming an angle of about 45° with respect to the contour line of the straight portion of the colored layer 11. Therefore, the contour line of the extension portion and the contour line of the columnar spacer are substantially in parallel with each other.

The light shielding layer 12 is arranged in the gap between the colored layers 11, and on the colored layers 11, and has a lattice shape as a whole. The contour line of the light shielding layer 12 has a straight portion and a corner portion. A region surrounded by the light shielding layer 12, that is, a picture element aperture region does not have a perfect rectangular shape having four inner right angles, but has a rectangular shape with four chamfered corners. The contour line of the corner portion of the light shielding layer 12 is formed to make an angle of about 45° with respect to the contour line of the straight portion of each of the colored layers 11. Thereby, the contour line of the corner portion of the light shielding layer 12 and the contour line of the columnar spacer are also substantially in parallel with each other.

When the colored layer 11, the light shielding layer 12, and the columnar spacer 13 are formed to have such shapes, the contour line of the columnar spacer 13 provided at the position overlapping with the extension portion is formed to have a shape corresponding to both the contour line of the extension portion of the colored layer 11 and the contour line of the corner portion of the light shielding layer 12. Therefore, a fixed distance is maintained between the contour line of the extension portion of the colored layer 11, and the contour line of the columnar spacer 13, and also a fixed distance is maintained between the contour line of the corner portion of the light shielding layer 12, and the contour line of the columnar spacer 13. Further, a fixed distance is also maintained between the contour line of the extension portion 11 of the colored layer 11, and the contour line of the light shielding layer 12 arranged in the gap between the colored layers 11. Thereby, in Embodiment 1, even in the case where the columnar spacer is misaligned at the time of formation thereof, unevenness and roughness are not caused in the display, and hence the display quality is maintained. Specifically, it is preferred that the distance between the contour line of the extension portion of the colored layer 11 and the contour line of the columnar spacer 13 is not less than 3.0 µm. Thereby, even when the columnar spacer 13 is misaligned, it is possible to suppress the possibility that the underlying film thickness is varied. Further, it is preferred that the distance between the contour line of the corner portion of the light shielding layer 12 and the contour line of the extension portion of the colored layer 11 is not less than 3.0 µm. Thereby, it is possible to suppress the possibility that light escaping is caused due to the misalignment. Further, it is preferred that the distance between the contour line of the corner portion of the light shielding layer 12 and the contour line of the columnar spacer 13 is not less than 8.0 µm. Thereby, it is possible to suppress the possibility that the light leakage is caused due to the influence of the columnar spacer 13 at the time when the columnar spacer 13 is misaligned.

In Embodiment 1, the columnar spacer 13 is formed not only at the position overlapping with the extension portion of the colored layer 11 but also at the position overlapping with the straight portion of the colored layer 11. In the columnar spacer 13 formed at the position overlapping with the straight portion of the colored layer 11, the shape of the surface of the columnar spacer 13, the surface being in contact with the substrate, can be formed, for example, in a regular octagonal shape as shown in FIG. 1, because it is not necessary to consider the contour line of the colored layer 11, and the contour line of the light shielding layer 12.

Reference Example 1

Figure 3:
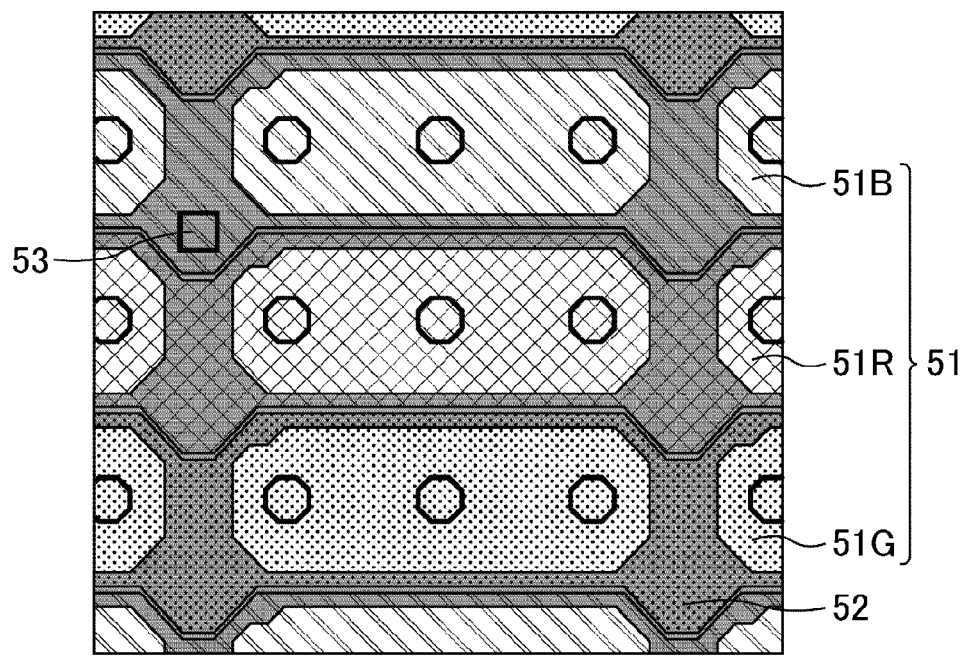
FIG. 3 is a planar schematic view in which the substrate surface of a liquid crystal display device of Reference Example 1 is enlarged.

FIG. 3 is a planar schematic view in which the substrate surface of a liquid crystal display device of Reference Example 1 is enlarged. As shown in FIG. 3, in Reference Example 1, each colored layer 51 forms a stripe array, and has not only a straight portion but also an extension portion which is extended in the direction different from the extending direction of the straight portion. Further, a columnar spacer 53 is formed at a position overlapping with the extension portion of each of the colored layers 51.

However, the surface of the columnar spacer 53, which is in contact with the substrate, has a square shape, and the contour line of the columnar spacer 53 is in parallel with or perpendicular to the contour line of the straight portion of the colored layer 51. The contour line of the extension portion of the colored layer 51 and the contour line of the columnar spacer 53 form an angle of about 45°. Therefore, the distance between the contour line of the extension portion of the colored layer 51 and the contour line of the columnar spacer 53 is not maintained, and portions in which the distance between the contour line of the extension portion of the colored layer 51 and the contour line of the columnar spacer 53 is short are partially formed. Further, since the contour line of the corner portion of the light shielding layer 52 and the contour line of the columnar spacer 53 form an angle of about 45°, the distance between the contour line of the corner portion of the light shielding layer 52 and the contour line of the columnar spacer 53 is not maintained, and hence portions in which the distance between the contour line of the corner portion of the light shielding layer 52 and the contour line of the columnar spacer 53 is short are partially formed.

In such a configuration, when the columnar spacer 53 is misaligned, the columnar spacer 53 is formed across the contour line of the colored layer 51, and thereby the cell thickness is varied due to the influence of the variation in the thickness of the colored layer, so as to cause display unevenness. Further, the columnar spacer 53 is formed in the inside of the region (picture element aperture region) surrounded by the light shielding layer 52, and thereby the light leakage is caused, so that the roughness can be generated in the display. Therefore, it can be said that the liquid crystal display device of Embodiment 1 has a structure stronger against the misalignment as compared with the liquid crystal display device of Reference Example 1.

In Embodiment 1, the columnar spacer 13 is formed at a position overlapping with the colored layer 11. For example, when the columnar spacer 13 is configured as a multilayer spacer formed by laminating the color materials of the colored layers 11, the columnar spacer 13 can be more efficiently formed. When the columnar spacer 13 is configured as a multilayer spacer in FIG. 1, the columnar spacer 13 can be formed by laminating, for example, the light shielding layer 12, the color material of the blue colored layer 11B, the color material of red colored layer 11R, and the color material of the green colored layer 11G. Further, when the columnar spacer 13 is a multilayer spacer in the example shown in FIG. 1, the contour line of the colored layer 11 positioned on the blue colored layer 11B as the extension portion becomes the contour line of the columnar spacer 13 according to the present invention. In Embodiment 1, when the columnar spacer 13 is a multilayer spacer, the kinds, the number, and the order of the laminated color materials are not limited. Further, the kinds of colors used as the extension portion are not limited, and also the order of the colors forming the extension portion is not limited. For example, when the columnar spacer is formed at a position overlapping with the red extension portion, the red color material may be formed as an underlayer of a green color material and a blue color material, or may be formed so as to cover the whole of the green color material and the blue color material.

In Embodiment 1, the region surrounded by the contour line of the light shielding layer 12, that is, the picture element aperture region is formed so that each of the four corners of the region is formed to have a corner portion cut in the direction of about 45° with respect to each of the sides of the picture element aperture region. Therefore, in Embodiment 1, each picture element has a shape with four chamfered corners. In the case where each picture element has the shape with equally chamfered corners, for example, when the inside of the liquid crystal layer corresponding to one picture element is divided into four orientation domains, the balance of orientation of liquid crystal molecules can be equally divided into the four regions, and hence the viewing angle characteristics can be improved.

Figure 4:
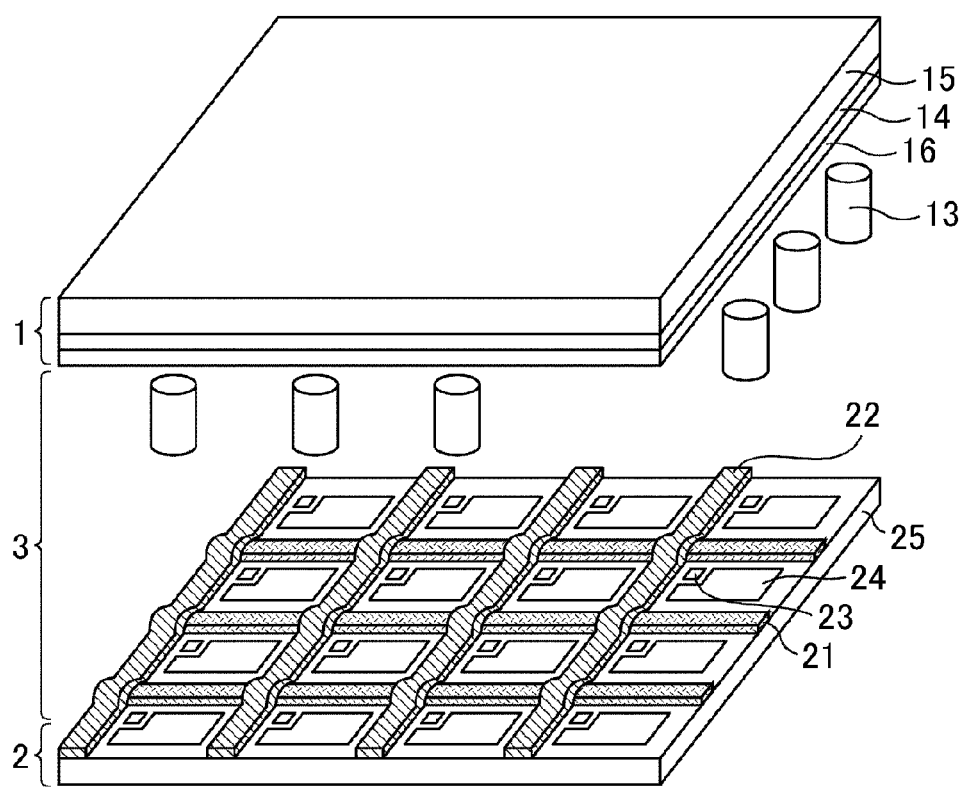
FIG. 4 is an exploded perspective schematic view of the liquid crystal display device of Embodiment 1.

FIG. 4 is an exploded perspective schematic view of the liquid crystal display device of Embodiment 1. As shown in FIG. 4, the liquid crystal display device of Embodiment 1 includes a pair of substrates 1 and 2, and a liquid crystal layer 3 sandwiched between the pair of substrates 1 and 2. A plurality of the columnar spacers 13 for retaining the thickness (cell gap) of the liquid crystal layer 3 are provided between the pair of substrates 1 and 2. One of the substrates is the active matrix substrate 2 on which electrodes, wirings, switching elements, and the like, are arranged, and the other of the substrates is the color filter substrate 1 on which the colored layers, the light shielding layer, electrodes, and the like, are arranged. Each of the substrates 1 and 2 includes each of glass substrates 15 and 25 as a main substrate.

In the active matrix substrate 2, pixel electrodes 24, scanning lines 21, data wirings 22, and TFTs (thin film transistors) 23 are provided on the surface of the glass substrate 25 on the side of the liquid crystal layer 3. The gate electrode of the TFT 23 is connected to the scanning line 21 which is extended in the row direction, and which supplies a scanning signal, while the source electrode of the TFT 23 is connected to the data wiring 22 which is extended in the column direction and which supplies an image signal. When a gate voltage serving as a scanning signal, which is supplied in pulses at a predetermined timing from a gate driver, is applied to the TFT 23, an image signal is supplied to the pixel electrode 24 from the data wiring 22 in correspondence with the timing of the gate voltage. A plurality of the pixel electrodes 24 are arranged in a matrix form, and each of the pixel electrodes 24 is formed at a position overlapping with a picture element aperture region. The pixel electrode 24 has translucency, and a metal oxide, such as ITO (indium tin oxide) and IZO (indium zinc oxide), is preferably used as the material of the pixel electrode 24.

In the color filter substrate 1, the colored layers 11 and the light shielding layer 12 (which are collectively denoted by reference numeral 14 in FIG. 4) are provided on the surface of the glass substrate 15 on the side of the liquid crystal layer 3. The light shielding layer 12 is formed into a lattice shape so that the region surrounded by the light shielding layer 12 overlaps with the pixel electrode 24. A counter electrode 16, which, together with the pixel electrode 24, forms an electric field in the liquid crystal layer 3, is provided on the whole surface of the colored layers 11 and the light shielding layer 12 on the side of the liquid crystal layer 3. The counter electrode 16 has translucency, and a metal oxide, such as ITO and IZO, is preferably used as the material of the counter electrode 16. Thereby, the display can be controlled in such a manner that the polarization state of light transmitted through the liquid crystal layer 3 is changed by changing the alignment state of liquid crystal molecules by the application of a voltage into the liquid crystal layer 3.

Embodiment 2

Figure 5:
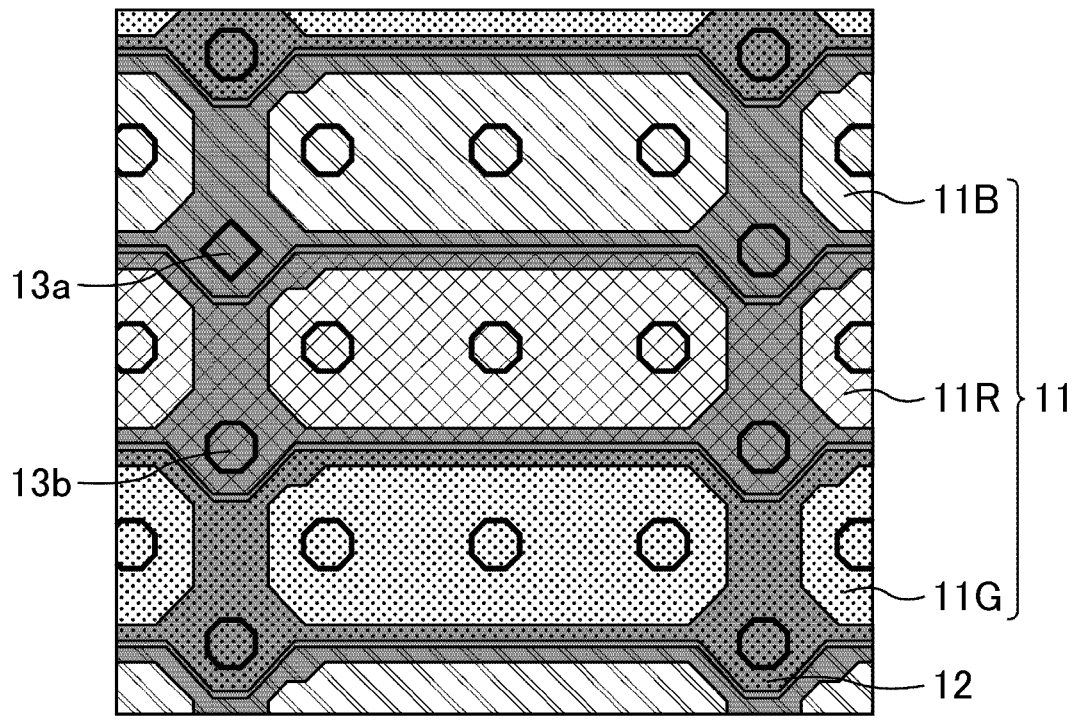
FIG. 5 is a planar schematic view in which the substrate surface of a liquid crystal display device of Embodiment 2 is enlarged.

FIG. 5 is a planar schematic view in which the substrate surface of a liquid crystal display device of Embodiment 2 is enlarged. The liquid crystal display device of Embodiment 2 is different from Embodiment 1 in the arrangement of the columnar spacer, but is the same as Embodiment 1 except the arrangement of the columnar spacer.

As shown in FIG. 5, in Embodiment 2, the columnar spacer 13 arranged at a position overlapping with the extension portion of the colored layer 11 is formed in each of the green colored layer 11G, the blue colored layer 11B, and the red colored layer 11R. The columnar spacer 13 overlapping with the extension portion of the blue colored layer 11B has a substantially rhombus shape similarly to Embodiment 1. However, the columnar spacer 13 overlapping with the extension portion of the green colored layer 11G, and the columnar spacer 13 overlapping with the extension portion of the red colored layer 11R have a substantially regular octagonal shape. In the following description, the columnar spacer having the substantially rhombus shape and overlapping with the extension portion of the blue colored layer 11B is represented as a first columnar spacer 13a, and the columnar spacer having the substantially regular octagonal shape and overlapping with the extension portion of each of the green colored layer 11G and the red colored layer 11R is represented as a second columnar spacer 13b.

In Embodiment 2, the columnar spacer 13 of a different shape is formed in each of the extension portions of the blue colored layer 11B. The second columnar spacer 13b having the substantially regular octagonal shape is formed at the position overlapping with the extension portion of the green colored layer 11G and the extension portion of the red colored layer 11R. However, the first columnar spacer 13a having the substantially rhombus shape, and the second columnar spacer 13b having the substantially regular octagonal shape are both formed at the positions overlapping with the extension portions of the blue colored layer 11B.

The first columnar spacer 13a and the second columnar spacer 13b may be the same in height, or may be different in height. However, a design that is strong against pressing force can be obtained, when the heights of the first columnar spacer 13a and the second columnar spacer 13b are made different from each other in such a manner that the first columnar spacer 13a is formed as a main columnar spacer having a larger height, and that the second columnar spacer 13b is formed as a sub columnar spacer having a smaller height. Note that in this case, it is preferred that the difference between the height of the first columnar spacer 13a and the height of the second columnar spacer 13b is in the range of 0.3 to 0.7 µm. Further, the surfaces of the first columnar spacer 13a and the second columnar spacer 13b, which are in contact with the substrate, may have the same shape or may have different shapes. When the surfaces of the first columnar spacer 13a and the second columnar spacer 13b, which are in contact with the substrate, have different shapes, the first columnar spacer 13a and the second columnar spacer 13b can be distinguished by their shapes, so that the columnar spacers are easily managed.

Embodiment 3

Figure 6:
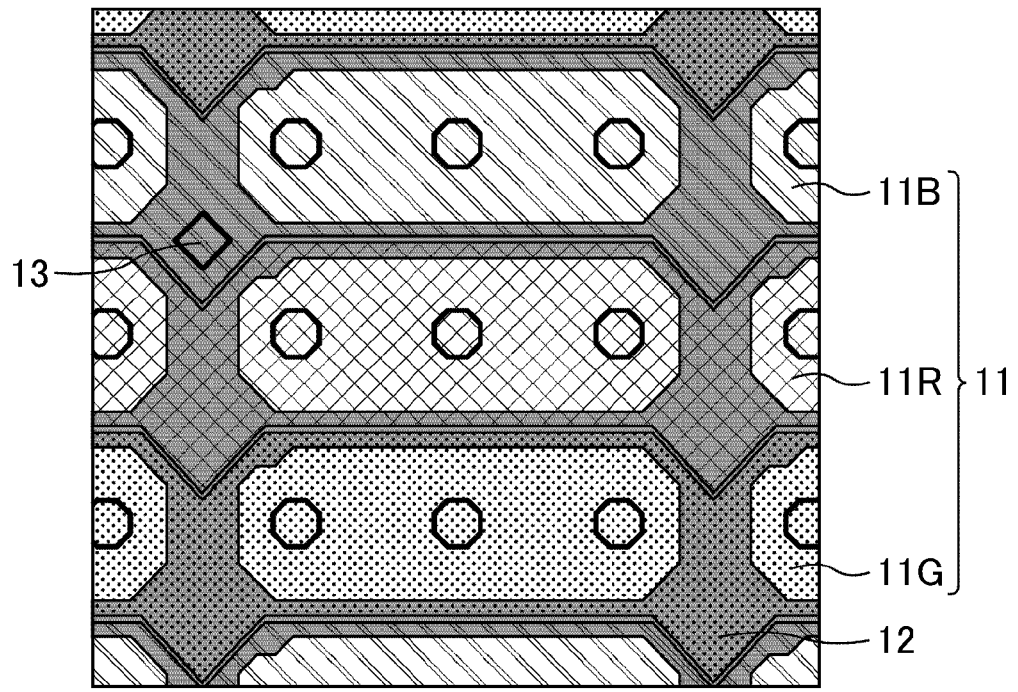
FIG. 6 is a planar schematic view in which the substrate surface of a liquid crystal display device of Embodiment 3 is enlarged, and which corresponds to the form in Embodiment 1.
Figure 7:
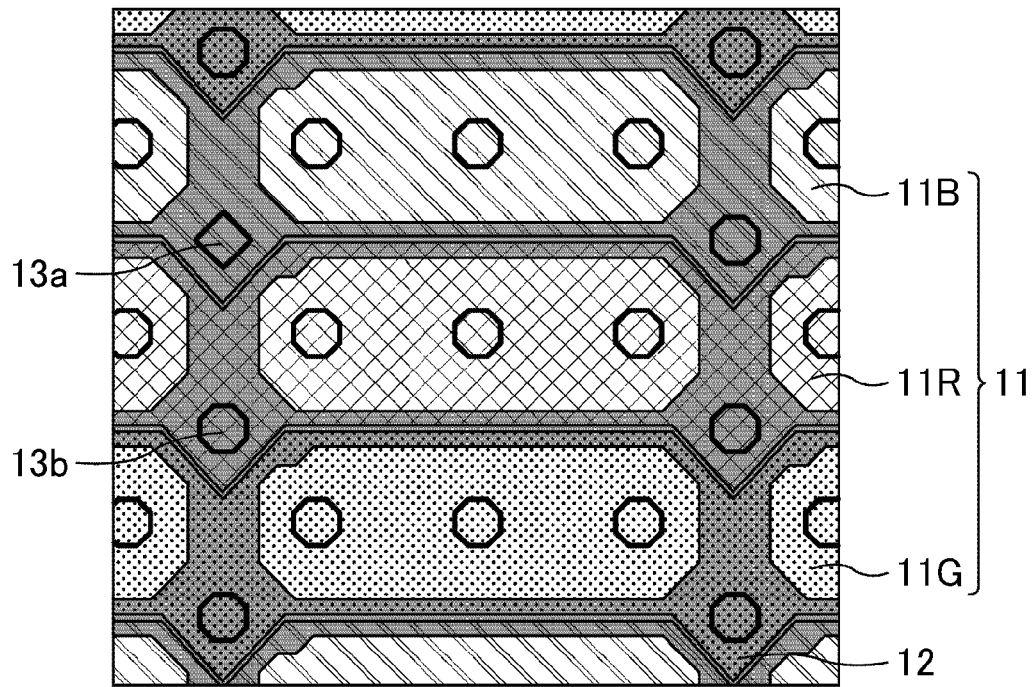
FIG. 7 is a planar schematic view in which the substrate surface of the liquid crystal display device of Embodiment 3 is enlarged, and which corresponds to the form in Embodiment 2.

Each of FIG. 6 and FIG. 7 is a planar schematic view in which the substrate surface of a liquid crystal display device of Embodiment 3 is enlarged. FIG. 6 shows a form corresponding to Embodiment 1, and FIG. 7 shows a form corresponding to Embodiment 2. The liquid crystal display device of Embodiment 3 is different from Embodiment 1 and Embodiment 2 in the shape of the extension portion of the colored layer 11, but is the same as Embodiment 1 and Embodiment 2 except the shape of the extension portion of the colored layer 11.

As shown in FIG. 6 and FIG. 7, in Embodiment 3, the distal end of the extension portion of the colored layer 11 is formed to be sharpened in the plan view of the substrate. Thereby, the contour line of the columnar spacer 13 having the substantially rhombus shape forms a shape precisely corresponding to the contour line of the extension portion of the colored layer 11 and to the contour line of the corner portion of the light shielding layer 12, and hence the distance between the contour lines can be more surely secured, so that the height of the columnar spacer 13 can be further stabilized.

In Embodiment 3, a plurality of the columnar spacers having different shapes may be provided as shown in FIG. 7, or may not be provided as shown in FIG. 6.

Embodiment 4

Figure 8:
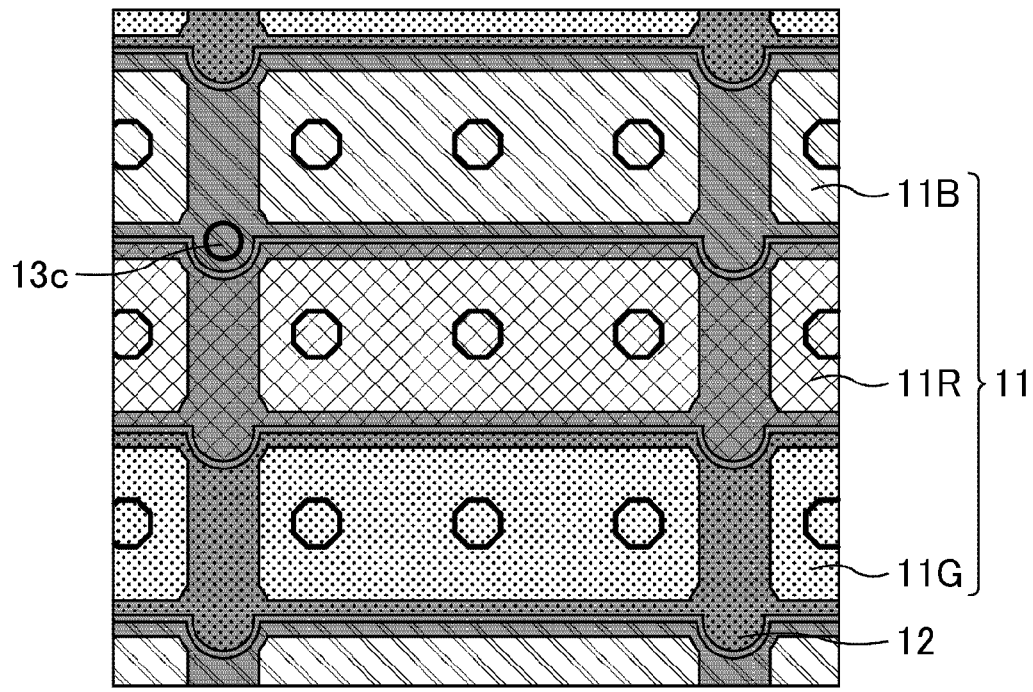
FIG. 8 is a planar schematic view in which the substrate surface of a liquid crystal display device of Embodiment 4 is enlarged.

FIG. 8 is a planar schematic view in which the substrate surface of a liquid crystal display device of Embodiment 4 is enlarged. The liquid crystal display device of Embodiment 4 is different from Embodiment 1 to Embodiment 3 in the shape of the extension portion of the colored layer 11, and the shape of the contour line of the columnar spacer 13, but is the same as Embodiment 1 to Embodiment 3 except the shape of the extension portion of the colored layer 11, and the shape of the contour line of the columnar spacer 13. FIG. 8 shows a form corresponding to Embodiment 1.

As shown in FIG. 8, in Embodiment 4, in the plan view of the substrate, the distal end of the extension portion of the colored layer 11 is formed to be rounded, and the contour line of a columnar spacer 13c is formed to have a circular shape. Thereby, the contour line of the columnar spacer 13c is formed in a shape precisely corresponding to the contour line of the extension portion of the colored layer 11 and to the contour line of the corner portion of the light shielding layer 12, and hence the distance between the contour lines can be more surely secured, so that the height of the columnar spacer 13c can be further stabilized.

Embodiment 5

Figure 9:
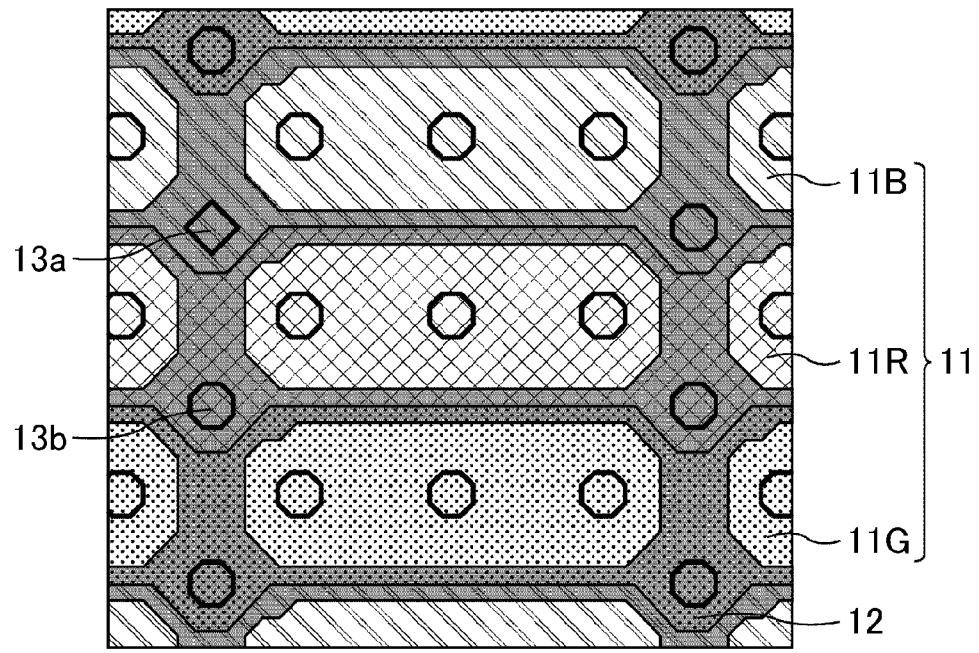
FIG. 9 is a planar schematic view in which the substrate surface of a liquid crystal display device of Embodiment 5 is enlarged.

FIG. 9 is a planar schematic view in which the substrate surface of a liquid crystal display device of Embodiment 5 is enlarged. The liquid crystal display device of Embodiment 5 is different from Embodiment 1 to Embodiment 4 in the arrangement of the colored layer and the light shielding layer, but is the same as Embodiment 1 to Embodiment 4 except the arrangement of the colored layer and the light shielding layer. FIG. 9 shows a form corresponding to Embodiment 2.

As shown in FIG. 9, in Embodiment 5, the light shielding layer 12 is not arranged in the gap between the respective colored layers 11, and the colored layers 11 are brought into direct contact with each other. Even in this form, there is no problem in terms of light shielding property, and such a form may be adopted according to the design.

Figure 10:
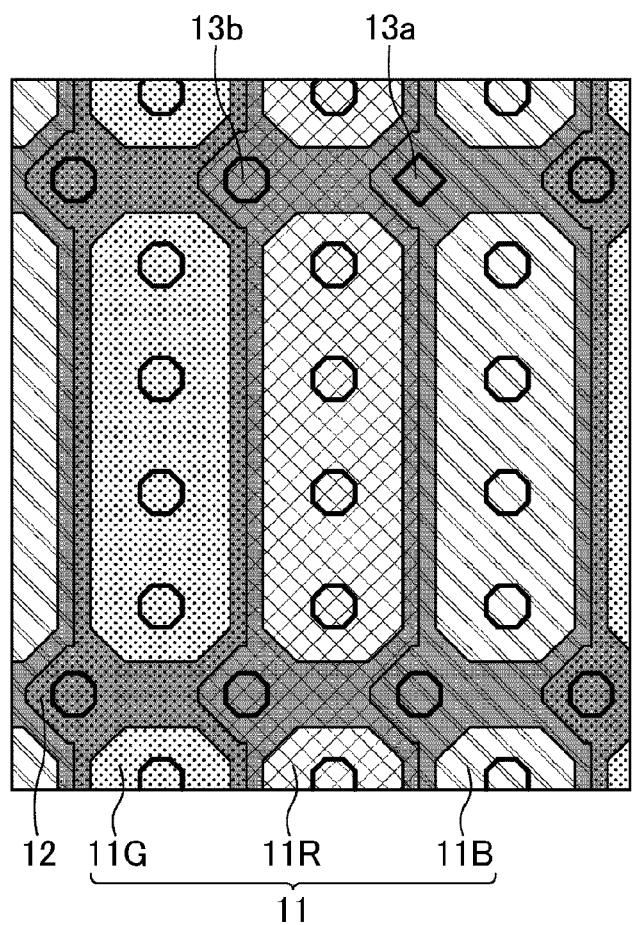
FIG. 10 is a planar schematic view showing a modification of Embodiment 5.

FIG. 9 shows a form in which the respective colored layers have a lateral stripe array, and in which the respective picture elements are made laterally long, but as shown in FIG. 10, a form may also be adopted in which the respective colored layers have a longitudinal stripe array, and in which the respective picture elements are made longitudinally long. FIG. 10 is a planar schematic view of a modification of Embodiment 5.

Embodiment 6

Figure 11:
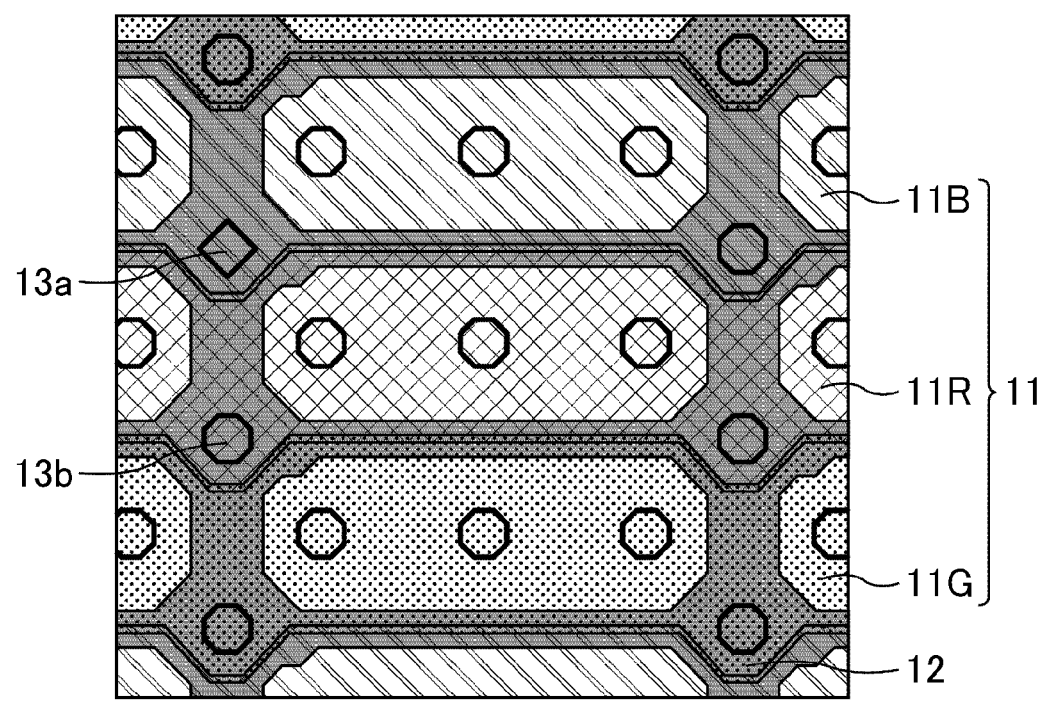
FIG. 11 is a planar schematic view in which the substrate surface of a liquid crystal display device of Embodiment 6 is enlarged.
Figure 12:
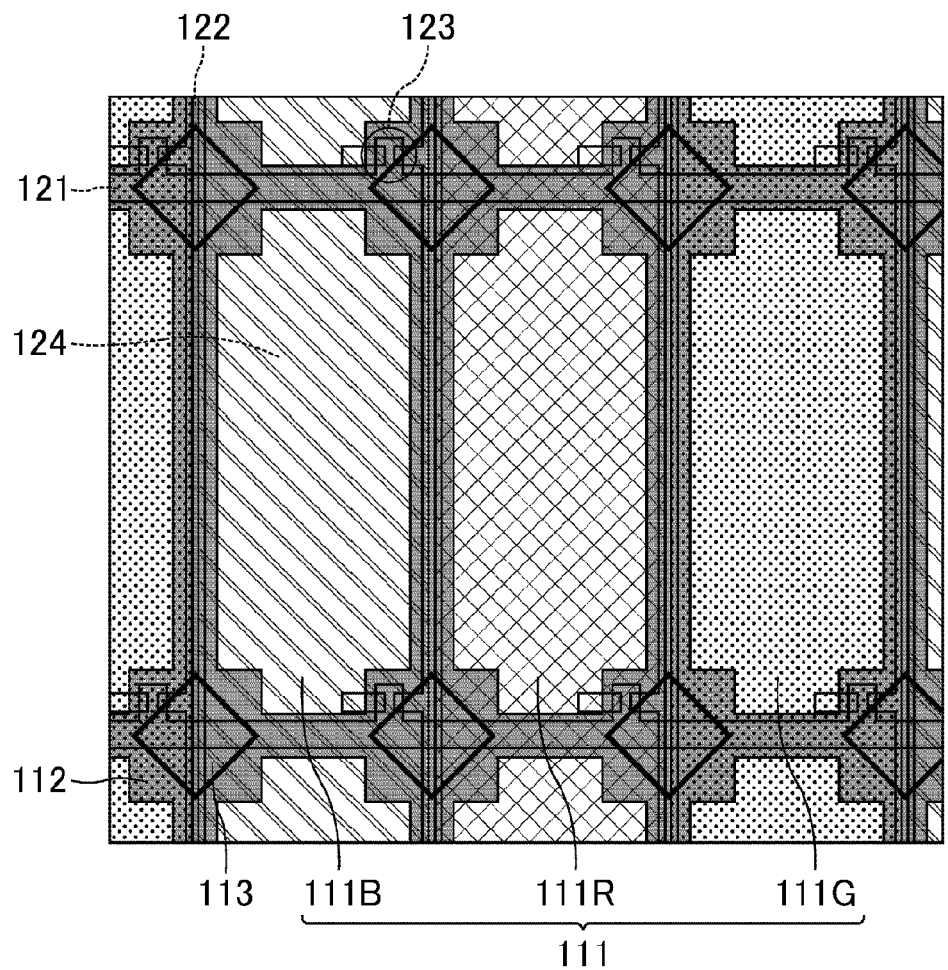
FIG. 12 is a planar schematic view showing a conventional form of arranging a light shielding layer and columnar spacers.

FIG. 11 is a planar schematic view in which the substrate surface of a liquid crystal display device of Embodiment 6 is enlarged. The liquid crystal display device of Embodiment 6 is different from Embodiment 1 to Embodiment 5 in the arrangement of the colored layer and the light shielding layer, but is the same as Embodiment 1 to Embodiment 5 except the arrangement of the colored layer and the light shielding layer. FIG. 11 shows a form corresponding to Embodiment 2.

As shown in FIG. 11, Embodiment 6 has a structure in which the light shielding layer 12 is not arranged in the gap between the respective colored layers 11 in the plan view of the substrate, and in which one of the colored layers 11 adjacent to each other is placed on the other of the colored layers 11. Since the light shielding layer 12 is arranged to overlap with each of the colored layers 11 near the boundary between the colored layers 11, there is no problem in terms of light shielding property, and hence such a form may be adopted according to the design.

In the example shown in FIG. 11, a part of the green colored layer overlaps with a part of the blue colored layer, a part of the blue colored layer overlaps with a part of the red colored layer, and a part of the red colored layer overlaps with a part of the green colored layer. However, the laminating order of these layers is not limited in particular.

The present application claims priority to Patent Application No. 2010-096035 filed in Japan on Apr. 19, 2010 under the Paris Convention and provisions of national law in a designated State, the entire contents of which are hereby incorporated by reference.

REFERENCE SIGNS LIST

1: Color filter substrate
2: Active matrix substrate
3: Liquid crystal layer
11, 111: Colored layer
11R, 51R, 111R: Red colored layer
11G, 51G, 111G: Green colored layer
11B, 51B, 111B: Blue colored layer
12, 112: Light shielding layer
13, 53, 113: Columnar spacer
13a: First columnar spacer (rhombus shape)
13b: Second columnar spacer (regular octagonal shape)
13c: First columnar spacer (circular shape)
14: Colored layer or light shielding layer
15, 25: Glass substrate
16: Counter electrode
21, 121: Scanning line
22, 122: Data wiring
23, 123: TFT
24, 124: Pixel electrode

The invention claimed is:

1. A liquid crystal display device which includes a pair of substrates spaced at a distance from each other by a plurality of columnar spacers, and a liquid crystal layer sandwiched between the pair of substrates, and is configured such that a pixel is formed by picture elements of a plurality of colors, wherein:
one of the pair of substrates includes colored layers of a plurality of colors, and a light shielding layer;
at least one of the colored layers of the plurality of colors includes a region in which a colored layer of the same color is integrally arranged on respective picture elements adjacent to each other, and includes a straight portion and an extension portion extending from the straight portion;
at least one of the plurality of columnar spacers is provided at a position overlapping with the extension portion, and includes a contour line having a substantial rhombus shape;
the contour line of the columnar spacer includes a side having an inclined angle with respect to a contour line of the straight portion of the colored layer; and
the contour line of the extension portion has a shape corresponding to the contour line of the columnar spacer provided at the position overlapping with the extension portion, and a contour line of the extension portion and the contour line of the columnar spacer both include portions that are substantially in parallel with each other.

2. The liquid crystal display device according to claim 1, wherein:
the contour line of the light shielding layer includes a straight portion and a corner portion; and
the corner portion has a shape corresponding to the contour line of the columnar spacer provided at the position overlapping with the extension portion.

3. The liquid crystal display device according to claim 1, wherein:
each of the colored layers of the plurality of colors includes a straight portion and a folded portion; and
the extension portion defines a portion of the folded portion.

4. The liquid crystal display device according to claim 1, comprising a columnar spacer whose height is smaller than the height of the columnar spacer provided at the position overlapping with the extension portion.

5. The liquid crystal display device according to claim 4, wherein the surface of the columnar spacer having the smaller height, the surface being in contact with the substrate, has a substantially regular octagonal shape.

6. The liquid crystal display device according to claim 1, wherein the contour line of the straight portion of the colored layer and the contour line of the extension portion of the colored layer form an angle of about 45°.

7. The liquid crystal display device according to claim 1, wherein, in the plan view of the substrate, the distal end of the extension portion is sharpened.

8. The liquid crystal display device according to claim 1, wherein, in the plan view of the substrate, the distal end of the extension portion is rounded.

9. The liquid crystal display device according to claim 1, wherein, in the plan view of the substrate, the distal end of the extension portion is in parallel with the contour line of the straight portion.

10. The liquid crystal display device according to claim 1, wherein, in the plan view of the substrate, the shape of the extension portion is a substantially trapezoidal shape.

11. The liquid crystal display device according to claim 1, wherein, in the plan view of the substrate, the shape of the extension portion is a substantially semicircular shape.

12. The liquid crystal display device according to claim 1, wherein, in the plan view of the substrate, the shape of the extension portion is a substantially isosceles triangular shape.

13. The liquid crystal display device according to claim 1, wherein, in the plan view of the substrate, the shape of the extension portion is a substantially right-angled isosceles triangular shape.

14. The liquid crystal display device according to claim 1, wherein:
a distance between the contour line of the extension portion of the colored layer and the contour line of the columnar spacer is not less than 3.0 μm.

15. The liquid crystal display device according to claim 1, wherein a distance between the contour line of the corner portion of the light shielding layer and the contour line of the extension portion of the colored layer is not less than 3.0 μm.

16. A liquid crystal display device which includes a pair of substrates spaced at a distance from each other by a plurality of columnar spacers, and a liquid crystal layer sandwiched between the pair of substrates, and is configured such that a pixel is formed by picture elements of a plurality of colors, wherein:
one of the pair of substrates includes colored layers of a plurality of colors, and a light shielding layer;
at least one of the colored layers of the plurality of colors includes a region in which a colored layer of the same color is integrally arranged on respective picture elements adjacent to each other, and includes a straight portion and an extension portion extending from the straight portion;
at least one of the plurality of columnar spacers is provided at a position overlapping with the extension portion, and includes a contour line having a substantial rhombus shape;
the contour line of the columnar spacer includes a side having an inclined angle with respect to a contour line of the straight portion of the colored layer;
the contour line of the light shielding layer includes a straight portion and a corner portion; and
the corner portion has a shape corresponding to the contour line of the columnar spacer provided at the position overlapping with the extension portion, and a contour line of the corner portion of the light shielding layer and the contour line of the columnar spacer both include portions that are substantially in parallel with each other.

17. The liquid crystal display device according to claim 16, wherein the contour line of the extension portion has a shape corresponding to the contour line of the columnar spacer provided at the position overlapping with the extension portion.

18. The liquid crystal display device according to claim 16, wherein the contour line of the straight portion of the light shielding layer and the contour line of the corner portion of the light shielding layer form an angle of about 45°.

19. The liquid crystal display device according to claim 16, wherein:
a distance between the contour line of the extension portion of the colored layer and the contour line of the columnar spacer is not less than 3.0 μm.

20. The liquid crystal display device according to claim 16, wherein a distance between the contour line of the corner portion of the light shielding layer and the contour line of the extension portion of the colored layer is not less than 3.0 μm.

* * * * *